United States Patent [19]

Broering et al.

[11] 4,252,969

[45] Feb. 24, 1981

[54] PROCESS FOR REGULATING PARTICLE SIZE OF FINELY DIVIDED THERMOPLASTIC RESINS

[75] Inventors: Leo H. Broering, Ft. Wright, Ky.; Gary W. Duncan, Cincinnati, Ohio

[73] Assignee: National Distillers and Chemical Corp., New York, N.Y.

[21] Appl. No.: 79,411

[22] Filed: Sep. 27, 1979

Related U.S. Application Data

[63] Continuation-in-part of Ser. No. 947,800, Oct. 2, 1978, abandoned.

[51] Int. Cl.$^3$ .............................................. C08J 3/06
[52] U.S. Cl. ........................... 528/492; 260/29.6 NR; 260/29.6 XA; 260/29.6 MN; 260/29.6 ME; 260/29.6 PM; 264/9
[58] Field of Search ............... 528/492; 260/29.6 NR, 260/29.6 XA, 29.6 MN, 29.6 ME, 29.6 PM; 264/9

[56] References Cited

U.S. PATENT DOCUMENTS

| | | | |
|---|---|---|---|
| 2,674,619 | 4/1954 | Lundsted | 260/31.4 R |
| 2,677,700 | 5/1954 | Jackson et al. | 260/31.4 R |
| 3,250,719 | 5/1966 | Schmolka et al. | 252/548 |
| 3,418,265 | 12/1968 | McClain | 260/29.6 XA |
| 3,422,049 | 1/1969 | McClain | 260/29.6 NR |
| 3,432,339 | 3/1969 | Howell et al. | 260/889 |
| 3,432,483 | 3/1969 | Peoples et al. | 260/29.2 R |
| 3,449,291 | 6/1969 | Lerman et al. | 260/42.21 |
| 3,522,036 | 7/1970 | Vest et al. | 260/878 R |
| 3,586,654 | 6/1971 | Lerman et al. | 260/42.21 |
| 3,644,263 | 2/1972 | Burke | 260/29.6 PM |
| 3,669,922 | 6/1972 | Bartsch et al. | 260/42.21 |
| 3,674,736 | 7/1972 | Lerman et al. | 260/42.24 |
| 4,052,331 | 10/1977 | Dumoulin | 260/29.6 NR |
| 4,123,403 | 10/1978 | Warner et al. | 260/29.6 NR |

*Primary Examiner*—Ronald W. Griffin
*Attorney, Agent, or Firm*—Kenneth D. Tremain

[57] ABSTRACT

Powders of thermoplastic resins such as polyethylene homopolymer and ethylene-vinyl acetate copolymer having controlled average particle sizes are obtained by agitating molten resin in admixture with water in the presence of a dispersing amount of a polyalkylene oxide surface active agent and a particle size-controlling amount of an alkanolamide surface active agent.

12 Claims, No Drawings

PROCESS FOR REGULATING PARTICLE SIZE OF FINELY DIVIDED THERMOPLASTIC RESINS

CROSS REFERENCE TO RELATED APPLICATION

This application is a continuation-in-part of copending U.S. patent application Ser. No. 947,800 filed Oct. 2, 1978, now abandoned.

BACKGROUND OF THE INVENTION

1. Field of the Invention

This invention belongs to the field of processes for providing thermoplastic resins in the form of fine particles and, more particularly, to such processes in which the particles are obtained from aqueous dispersions of resin.

2. Description of the Prior Art

Thermoplastic resins in finely-divided form have found use in a number of applications where it is either impossible or inconvenient to utilize the more conventional cube or pellet forms. For example, powdered organic polymeric thermoplastic resins in dry form have been used to coat articles by dip coating in either a static or fluidized bed, by powder coating wherein the powder is applied by spraying or dusting, and by flame spraying. In dispersed form, thermoplastic resin powders have been applied as coatings by roller coating, spray coating, slush coating, and dip coating to substrates such as metal, paper, paperboard, and the like. These powders have also been widely employed in conventional powder molding techniques. Other applications of these powders include paper pulp additive; mold release agent for rubber; additives to waxes, paints, and polishes; binder for non-woven fabrics; and so on.

It is well known that high molecular weight thermoplastic resins, for example, polyethylene and ethylene copolymers, may be converted to dispersions of spherically shaped particles which are substantially devoid of particles greater than 25 microns in diameter and in which the number average particle diameter is less than about 10 microns. (Hereinafter, the term "finely divided" and terms of like import will mean such spherical particles.) Thus, U.S. Pat. No. 3,422,049 teaches that such dispersions of finely divided particles may readily be prepared by agitating the molten resin in admixture with water at elevated temperatures and at autogenous pressure, in the presence of certain dispersing agents which are particular block copolymers of ethylene oxide and propylene oxide. The non-agglomerated spherical particles can be recovered as powders by cooling the dispersions below the fusion point of the resin and collecting the suspended material by filtration or centrifugation.

U.S. Pat. No. 3,418,265 further teaches that the particle size of such thermoplastic resin disperions can be reduced still further, to the sub-micron level, while retaining the unique spherical particle shape by including in the dispersion process a volatile, inert, water-insoluble organic liquid that is soluble in the thermoplastic resin in an amount between 0.5 and 20 parts per 100 parts of the resin, whereupon a stable, aqueous, film-forming latex is ultimately obtained as the final product. Alternatively, U.S. Pat. No. 3,522,036 teaches that stable, film-forming aqueous latices of high molecular weight polyethylene can also be formed by including a liquid vinyl monomer such as styrene in the dispersion process.

Although the foregoing dispersion procedures are conveniently operated as batch processes, it is also known to produce such finely divided powders in a sequential, continuous dispersion process. See, e.g., U.S. Pat. No. 3,432,483.

U.S. Pat. No. 3,586,654 teaches that it is further possible to conduct the dispersion process in such a way that the polymer particles may be further transformed into spherical particles of controlled average size and size distributions which are the same, larger or smaller than the starting particles. If desired, the dispersion process can be modified in such a manner as to produce spherical foamed particles (U.S. Pat. No. 3,472,801), or to incorporate within the particles certain colorants (U.S. Pat. No. 3,449,291) and pigments (U.S. Pat. No. 3,674,736).

The fine powders are, by virtue of their small particle size, narrow particle size range, and spherical particle shape, unique states of matter which cannot readily be prepared by other conventional processes known in the art. The advantages and utility of such fine powders has been described in many of the aforesaid patent disclosures. In addition, it has been found that various substrates can be coated by applying the above described dispersions of polyolefin fine powders in an inert carrier, heating to evaporate the carrier, and fusing the polyolefin to the substrate (U.S. Pat. No. 3,432,339). Further, U.S. Pat. No. 3,669,922 teaches a process for preparing colored polymer powders having controlled charge and printing characteristics of value as toners in electrostatic printing.

Generally speaking, these fine powder dispersion processes are, within their operating limits, relatively insensitive to changes in operating conditions, that is, the particle size ranges of the powders produced are not markedly changed by variations in pressure, temperature, agitator speed, concentration of surface active agent dispersant, retention time, etc. While significant changes in some process parameters may result in the production of some larger particle size powder, the bulk of the resin is recovered as a fine powder. Further changes in the process conditions in an effort to increase the percentage of larger particles may result in the generation of undesirable particle geometries, e.g., strings, fibers and non-spherical powders, which can cause fouling and plugging of the dispersion vessels and associated equipment.

SUMMARY OF THE INVENTION

In accordance with this invention, thermoplastic resin powders of controlled average particle size are obtained by dispersing the resin under conditions of rapid mixing in water heated to a temperature at or above the melting point of the resin in the presence of a dispersing amount of a polyalkyleneoxide surface active agent and a particle size-controlling amount of an alkanolamide surface active agent. Following cooling of the aqueous dispersion to a temperature which is below the solidification point of the resin, the resin is recovered therefrom as a finely divided powder of controlled particle size.

The use of an alkanolamide surface active agent in this process permits the production of resin particles within a much broader average size range than that attainable with the same and similar processes carried out in the absence of alkanolamide surface active agents. The process of this invention also permits the preparation of discrete powders from tacky resins such as the ethylene-vinyl acetate copolymers wherein the vinyl acetate is about 30% by weight or higher. As is well known, such resins demonstrate a tendency to coalescese into unmanageable agglomerates, a tendency which is progressively more pronounced with increasing vinyl acetate content and reduced particle size, and although the resins can be provided as powders by known dispersion processes, in subsequent processing they quickly flow together and cannot be readily redispersed.

Briefly stated, the invention herein provides a process for preparing solid organic polymeric thermoplastic resin particles of controlled particle size which comprises:

(a) agitating a mixture of the resin while in the molten state, a dispersion-forming amount of water, a dispersion-forming amount of a polyalkylene oxide surface active agent, and a particle size-controlling amount of an alkanolamide surface active agent to provide a dispersion; and, (b) cooling the dispersion to below the melting point of the resin to provide solid particles of resins.

The cooled dispersion of resin powder can be directly employed in various applications or the resin powder can be recovered therefrom using known and convention techniques such as filtration and centrifugation.

The exact mechanism by which this invention operates is not clearly understood and no attempt at explaining these surprising results will be made. Nevertheless, the use of polyalkyleneoxide surface active agents together with alkanolamide surface active agents in the described process does provide new and unobvious results resulting in a more economical and more efficient process for producing thermoplastic resin powders of controlled average particle size.

DESCRIPTION OF THE PREFERRED EMBODIMENTS

In general, the polymers suitable for the practice of this invention include any normally solid synthetic organic polymeric thermoplastic resin and decomposition point of which is somewhat higher than its melting point and somewhat less than the critical temperature of water. Included are polyolefins, vinyls, olefin-vinyl copolymers, olefin-allyl copolymers, polyamides, acrylics, polystyrenes, cellulosics, polyesters, and fluorcarbons.

The polyolefins most suitable for the practice of this invention include normally solid polymers of olefins, particularly mono-alpha-olefins, which comprise from two to about six carbon atoms, e.g., polyethylene, polypropylene, polybutene, polyisobutylene, poly (4-methylpentene), and the like. Preferred polyolefin feeds are polyethylene and polypropylene. Of particular significance is the fact that the present process is not limited to the relatively low molecular weight polyethylenes of prior art processes, but is equally effective for relatively high molecular weight polyethylene as well as for polypropylene and other higher olefins.

Vinyl polymers suitable for use in this invention include polyvinyl chloride, polyvinyl acetate, vinyl chloride/vinyl acetate copolymers, polyvinyl alcohol, and polyvinyl acetal. Especially preferred is polyvinyl chloride.

Suitable olefin-vinyl copolymers include ethylene-vinyl acetate, ethylene-vinyl propionate, ethylene-vinyl isobutyrate, ethylene-vinyl alcohol, ethylene-methyl acrylate, ethylene-ethyl acrylate, ethylene-ethyl methacrylate, and the like. Especially preferred are ethylene-vinyl acetate copolymers wherein the ethylene constitutes at least about 25% of the copolymer by weight.

Olefin-allyl copolymers include ethylene-allyl alcohol, ethylene-allyl acetate, ethylene-allyl acetone, ethylene-allyl benzene, ethylene-allyl ether, ethylene-acrolein, and the like. Ethylene-allyl alcohol is especially preferred.

Preferred among the polyamides are linear superpolyamide resins, commonly referred to as nylons. Such polymers can be made by the intermolecular condensation of linear diamines containing from 6 to 10 carbon atoms with linear dicarboxylic acids containing from 2 to 10 carbon atoms. Equally well the superpolyamides may be made from amide-forming derivatives of these monomers such as esters, acid chlorides, amines salts, etc. Also suitable are superpolyamides made by the intramolecular polymerization of omega-aminoacids containing 4 to 12 carbon atoms and of their amide-forming deravatives, particularly the internal lactams. Examples of specific nylons are polyhexamethylene adipamide, polyhexamethylene sebacamide, and polycaprolactam. Especially preferred are nylons having intrinsic viscosities ranging between 0.3 to 3.5 dl./g. determined in m-cresol.

Acrylic resins suitable for use in this invention include polymethyl methacrylate, polyacrylonitrile, polymethyl acrylate, polyethyl methacrylate, etc. Preferred is polymethyl methacrylate.

The thermoplastic resin dispersions in accordance with the invention are prepared as an aqueous system with the aid of a surface active agent dispersant. In accordance with the present invention, such surface active agents constitute nonionic polyalkyleneoxide products of the types described hereinafter.

One group of nonionic surface active agents which can be employed has a water-insoluble polyoxyalkylene glycol (other than ethylene glycol) nucleus with a molecular weight of more than 900 which has been extended with water-soluble polyoxyethylene groups at each end. The water-soluble portion of the molecule should constitute at least 50% by weight of the total. The polyoxyalkylene glycol can be aliphatic, aromatic or alicyclic in nature, can be saturated or unsaturated, and can be represented by the formula:

wherein x, y, m and n are integers. When $(C_mH_nO)_x$ is saturated aliphatic, n=2m.

Compounds in this class are described in U.S. Pat. Nos. 2,674,619 and 2,677,700.

The polyoxyalkylene compounds of U.S. Pat. No. 2,674,619 which can be used herein are defined by the formula:

wherein Y is the residue of an organic compound containing therein x active hydrogen atoms, n is an integer, and x is an integer greater than 1.

The values of n and x are such that the molecular weight of the compound, exclusive of E, is at least 900 as determined by hydroxyl number; E is a polyoxyalkylene chain wherein the oxygen/carbon atom ratio is at least 0.5, and E constitutes at least 50% by weight of the compound.

The polyoxyalkylene compounds of U.S. Pat. No. 2,677,700, which are useful herein, are defined by the formula:

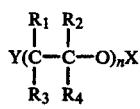

wherein: Y is the residue of an organic compound containing therein a single hydrogen atom capable of reacting with a 1,3-alkylene oxide; $R_1$, $R_2$, $R_3$ and $R_4$ are selected from the group consisting of H, aliphatic radicals and aromatic radicals, at least one such substituent being a radical other than hydrogen; n is greater than 6.4 as determined by hydroxyl number and X is a water-solubilizing group which is nonionic and constitutes at least 50% by weight of the total compound.

The compounds of U.S. Pat. No. 2,674,619 are sold commercially under the trademark "Pluronic" (BASF Wyandotte Corp.). The following are examples of compounds corresponding to the above formula:

| Name | Molecular weight, poly oxypropylene base | Ethylene oxide content in final product, weight percent | Molecular weight of final product |
|---|---|---|---|
| Pluronic F68 | 1,750 | 80 | 8,350 |
| Pluronic P75 | 2,050 | 50 | 4,150 |
| Pluronic F-98 | 2,750 | 80 | 13,500 |
| Pluronic F-108 | 3,250 | 80 | 14,000 |

Another group of surface active agents which can be employed has a water-insoluble nucleus with a molecular weight of at least 900 containing an organic compound having a plurality of reactive hydrogen atoms condensed with an alkylene oxide other than ethylene oxide and having water-soluble polyoxyethylene groups attached to each end. The weight percent of the hydrophilic portion of the molecule should be at least 50. These ethylene oxide adducts of an aliphatic diamine such as ethylene diamine extended with propylene oxide have the following formula:

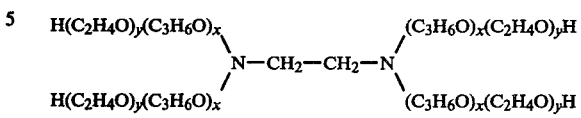

Compounds in this class are described in U.S. Pat. Nos. 2,674,619 and 3,250,719 and are sold commercially under the trademark "Tetronic" (BASF Wyandotte Corp). The following are examples of compounds corresponding to the above formula:

| Name | Molecular weight for ethylene di- amine-prolylene oxide base | Ethylene oxide content in final product, weight percent | Molecular weight of final product |
|---|---|---|---|
| Tetronic 707 | 3,000 | 75 | 12,000 |
| Tetronic 908 | 4,050 | 85 | 27,000 |

Other compounds in this class include ethylene oxide adducts of polyhydroxy alcohols extended with alkylene oxide, ethylene oxide adducts of polyoxyalkylene esters of polybasic acids, ethylene oxide adducts of polyoxyalkylene extended amides of polybasic acids, ethylene oxide adducts of polyoxyalkylene extended alkyl, alkenyl and alkynyl aminoalkanols, of which the hydrophobic nucleus should have a molecular weight of at least 900 and the hydrophilic part of the molecule should be at least 50% by weight of the total. It is to be understood that the above-mentioned organic compounds having a plurality of active hydrogen atoms as well as the polyoxyalkylene glycols can be aliphatic, aromatic or alicyclic in nature and can contain unsaturation.

Such compounds can be of the following formulae (m, n, x and y are as above):

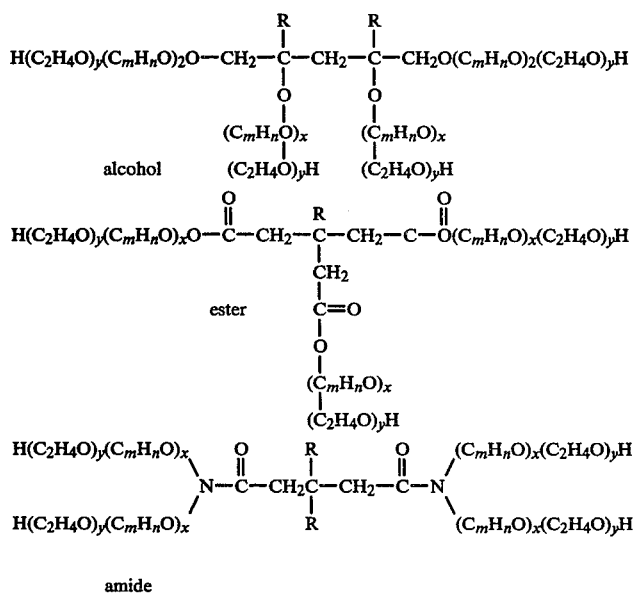

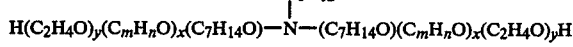

amine dialcohol (could be tri-)

A third group of nonionic surface active agents which can be employed includes high molecular weight polyoxyethylene adducts of hydrophobic organic compounds having one active hydrogen, such as aliphatic, saturated or unsaturated alcohols having at least eighteen carbon atoms; mono- or di-substituted alkyl, alkenyl or alkynyl aromatic or alicyclic alcohols of at least fifteen carbon atoms; monobasic aliphatic, saturated or unsaturated aromatic or alicyclic monobasic hydroxyl acid derivatives such as N-alkyl, -alkenyl or -alkynyl amides or alkyl, alkenyl or alkynyl esters of at least eighteen carbon atoms; alkyl, alkenyl or alkynyl glycol monobasic acid esters of at least eighteen carbon atoms; or di-N-alkyl, -alkenyl or -alkynyl (aromatic or alicyclic) aminoalkanols having at least eighteen carbon atoms. The hydrophilic portion of these molecules should be at least 50% by weight of the total. Such compounds can have the following formulae (m, n, x, and y are as above):

$C_{18}H_{37}O(C_2H_4O)_yH$
Alcohols

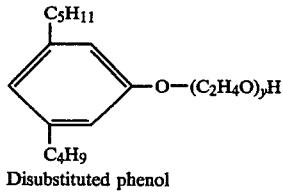
Disubstituted phenol

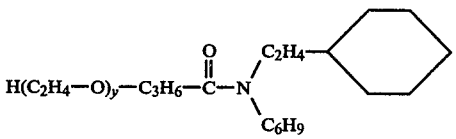
Amide of hydroxy acid $H(C_2H_4O)_y-O-C_2H_6C-O-C_{14}H_{29}$
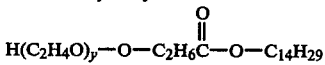
Ester of hydroxy acid

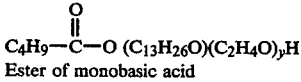
Ester of monobasic acid

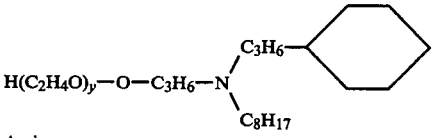
Amine

The preferred surface active agents are the Pluronics. These are nonionic block polymers and copolymers of ethylene oxide and propylene oxide, as well as other alkylene oxides.

The alkanolamide surface active agents which are useful herein are obtained by reacting a mono-or dialkanolamine with a long chain saturated or unsaturated fatty acid, i.e., an aliphatic carboxylic acid in which the aliphatic chain contains from about 10 to about 30 carbon atoms, in accordance with known and conventional techniques. Examples of alkanolamines which can be so reacted to provide suitable alkanolamide surface active agents are monoethaneolamine, diethanolamine, monisopropanolamine, diisopropanolamine, mono-sec-butanolamine, di-sec-butanolamine, methylethanolamine and butylethanolamine. Of the foregoing, monoethanolamine, diethanolamine and monoisopropanolamine are preferred and of these, monoethanolamine is especially preferred. The long chain saturated or unsaturated fatty acids which are reacted with the alkanolamines to provide the alkanolamide surface active agents herein can be selected from among any of the fatty acids and mixtures thereof heretofore used in the preparation of alkanolamide surface active agents and can be derived from any of the common animal, vegetable or synthetic sources. Complex and semi-refined mixtures of fatty acids such as those obtained from tallow, fish oil, coconut oil, palm oil, etc. can be employed. Specific acids include such saturated fatty acids as lauric, myristic, palmitic, stearic, arachidic and lignoceric acid, and such unsaturated acids as oleic, linoleic, linolenic, rincinoleic and arachidonic acids which, if desired, can be fully or partially hydrogenated prior to reaction with the alkanolamine. Among the alkanolamide surface active agents which can be used in the process of this invention and which are readily available from numerous sources are the coconut diethanolamides, coconut monoisopropanolamide, hydrogenated coconut alkanolamide, lauric alkanolamide, stearic monoethanolamide, stearic diethanolamide, lauric-myristic alkanolamide, lauric monoethanolamide, myristic monoethanolamide, lauric-myristic monoethanolamide, lauric myristic diethanolamide, coconut monoethanolamide, lauric monoisopropanolamide, olelyl alkanolamide, oleic diethanolamide and rincinoleic alkanolamide.

The foregoing polyalkyleneoxide and alkanolamide surface active agents are both stable and effective at temperatures ranging up to about 325° C. or higher, and more particularly at temperatures above about 160° C., especially at temperatures in the range of about 175° to 225° C. The dispersing agents of the present invention, by functioning effectively from temperatures as low as the melting point of low density polyethylene, i.e. about 115° C. up to as high as 325° C. are not limited to the dispersion of low molecular weight low density polyethylenes. For example, high molecular weight low density polyethylenes, linear polyethylene, polypropylene, polyvinyl chloride, ethylene-vinyl acetate copolymers, ethylene-allyl alcohol copolymers, nylon, and the like which either do not melt or which exhibit melt flow rates below about 15 at temperatures below 160° C. can be readily dispersed to dispersions substantially devoid of particles larger than 500 microns and wherein the particles have a relatively narrow size range. Where it is desired to prepare the finest dispersion of a given polymer, the dispersion temperature should be such that the resin being dispersed exhibits a melt flow rate of greater than 15, and more preferably, greater than 20. Where larger average particle sizes are desired or acceptable, however, dispersion temperatures may be employed, still in combination with only relatively mild agitation, at which the polymer exhibits a melt flow rate appreciably lower than 15, for example as low as about 2.

The temperature of operation is dependent upon the melting point, melt flow properties, decomposition temperature, and desired average particle size of the dispersion of the selected synthetic organic thermoplastic resin. While such resins can be dispersed at temperature commencing with their respective melting points, increases in dispersion temperature beyond the melting point and up to the decomposition of the resins are generally accompanied by corresponding increases in the fluidity of the molten resin. As the fluidity of the melt increases, the dispersions generally tend to develop lower average particle sizes without requiring increases in agitation effort.

The flow properties of a molten polymeric resin are closely related to its molecular weight. As the molecular weight of a given type of polymer is increased, its fluidity at a given temperature tends to lessen, that is, the polymer tends to offer greater resistance to breakdown to small particles. On the other hand, the melting point of the polymer varies little with changes in molecular weight. Consequently, while two polymers of the same type, e.g., low density polyethylene, but of different molecular weights may exhibit the same melting point and therefore be dispersable commencing at the same temperature, the higher molecular weight polymer will require high dispersion temperatures for the same agitation effort to achieve a fineness of dispersion equivalent to that of the polymer of lower molecular weight.

A convenient measure of the fluidity or flow of a thermoplastic polymer is afforded by the melt flow rate value as outlined under ASTM test method D1238-57T (2160 gram load).

The dispersing apparatus or device may be any device capable of delivering at least a moderate amount of shearing action under elevated temperatures and pressures to a liquid mixture. Suitable, for example, are conventional autoclaves equipped with conventional propeller stirrers. Propellers designed to impart greater shear to the mixture tend to improve the recovered yield of pulverulent polymer, but with little effect on the particle size and distribution of recovered polymer. The particle size and distribution are somewhat dependent on the stirring rate, higher stirring speeds resulting in finer and narrower dispersions until an optimum speed is reached above which there is little change. The overall recovery yield of pulverulent polyolefin from the dispersion is dependent upon the duration of stirring. For a given type and rate of stirring, a period of stirring exists within which maximum recoverable yields of pulverulent polyolefins result. Either shorter or longer periods of shearing result in lower recoverable yields. Preferred stirring periods for most dispersions generally will range from about 1 to 30 minutes, and preferably from about 10 to 20 minutes. It will be understood, however, that the stirring rates and periods will depend upon the type of equipment utilized. While the rate and duration of agitation affect particle size and distribution and recoverable yields of pulverulent polymer, these variables can be readily optimized for any given polyolefin through simple, routine experimentation. Agitator tip speed for most dispersion operations can vary from about 300 fpm to about 3000 fpm and preferably from about 800 fpm to about 1300 fpm.

In carrying out the subject process, the selected synthetic organic thermoplastic polymer is first contacted with water and the polyalkyleneoxide surface active agent dispersant. It is a particularly advantageous feature of this invention that the dispersant need not be incorporated into the polymer prior to the introduction of the water by such means as milling and the like, but may be introduced into the dispersing apparatus simultaneously with the other ingredients or as a solution in the aqueous phase. If desired, the dispersion process can be operated in a continuous manner, in which case it is convenient to premix the desired ratio of dispersant, water, and polymer, and introduce this mixture continuously to the reactor while continuously removing from another part of the reactor the product dispersion.

The amount of water used in relation to the polymer dispersed generally ranges from about 0.7 to about 10 parts by weight of water per part of normally solid polymer. Higher ratios are operable but uneconomical whereas lower ratios, although usable, present operational difficulties. The preferred range is between about 1 and about 6 parts per part of polymer.

The amount of dispersant should be sufficient to provide a dispersion of the resin in the water under the selected conditions. Very good dispersions can be obtained at amounts within the range of from about 6 to about 100 weight parts dispersant per 100 weight parts of resin and as such, these amounts are preferred. There is no upper limit on the amount of dispersant which can be employed except that exceeding the amount beyond that required to provide an acceptable dispersion may be economically wasteful.

The amount of alkanolamide surface active agent to be employed for a given resin and desired average particle size can be empirically determined through simple and routine experimentation. The weight ratio of polymer to alkanolamide surface active agent can vary over a wide range with ratios of polymer to surface active agent of from about 200:1 to about 10:1 providing good results and with ratios of from about 160:1 to about 20:1 being preferred. The alkanolamide surface active agent can be added subsequent to, or preferably, simultaneously with (either in the same or individual streams) the ethylene oxide-propylene oxide block copolymer surface active agent. In the case of continuous operation, the surface active agents are added simultaneously.

The temperature for forming the hot aqueous resin dispersion can range from about 100° C. to about 270° C. with temperatures of from about 150° C. to about 250° C. being preferred. It is, of course, recognized that the minimum temperature selected must be at or above the melt temperature of the resin being dispersed.

The pressure under which the present process is carried out is the autogenous pressure of the system or is so adjusted to exceed the vapor pressure of water at the operating temperature so as to maintain a liquid water phase. More particularly, the pressures may range from about 1 to 217 atmospheres, and preferably from about 6 to 120 atmospheres. In cases where the polymer is sensitive to air at the elevated dispersion temperature, an inert gas, e.g., nitrogen or helium, may be substituted for the air normally present, and deaerated water used.

If the dispersion is capable of forming a continuous film upon removal of the aqueous phase by evaporation, it is more definitely termed a latex. The above dispersions or latices can be utilized in coating metal or paper, in polish formulations, in paint formulations, for textile sizing and waterproofing, for coating fibers, etc.

In the case of dispersions which are not latices, the temperature of the dispersion may be lowered to below the melting temperature of the dispersed polymer, and the polymer separated from the aqueous phase in the form of discrete particles by filtration, centrifugation, evaporation of the water, and the like. If the temperature of the subject dispersion is lowered to below the boiling point of water and the pressure released, the finely-divided polymer may be recovered by simple atmospheric filtration. If desired, the freshly recovered resin particles can be washed with an organic liquid or water to remove all or most of the residual surface active agents which may be associated therewith.

The finely-divided polymers of this invention are superior in powder form for static or fluidized dip coating, spraying, dusting, and flame spraying applications as well as for preparing stable dispersions in water or some other medium for use in roller, dip, or spray coating. The relatively high molecular weight polymers of this invention also find use in the preparation of heat resistant coatings, in the preparation of molded or formed shapes by powder or slush molding techniques, and in the preparation of foams in combination with conventional blowing agents.

Of the following examples, all of which were carried out in the continuous processing unit of U.S. Pat. No. 3,432,483 which is incorporated by reference herein, Examples 1, 4, 7, 10, 12 and 13 are illustrative of a prior art dispersion process in which only ethylene oxide-propylene oxide block copolymer dispersant is employed and are offered by way of comparison to Examples 2, 3, 5, 6, 8 and 9 which are illustrative of the dispersion process of this invention. All parts are by weight unless otherwise indicated.

EXAMPLE 1

LS-618 Resin, a linear polyethylene resin having a density of 0.962 and a melt index of 17, is fed as a melt via an extruder into the reactor at a rate of 20 pounds per hour. A water-surface active agent solution containing approximately 12% by weight Pluronic F-98 (ethyleneoxidepropylene oxide block copolymer from BASF Wyandotte Corp.) is heated to about 220° C. and fed to the reactor at a rate of 50 pounds per hour. A Dowtherm heat transfer fluid is circulated through the jacket of the reactor to maintain the temperature in the reactor at about 220° C. An agitation system designed to provide vigorous agitation within the reactor is operated at a tip speed of 1300 fpm. Retention time in the reactor is approximately 16 minutes. The slurry flows from the reactor through a cooling exchanger to a pressure let down valve and is discharged to a holding or surge tank. The slurry is then filtered, repulped with water to remove residual surfactant, refiltered and dried. The polyethylene product is recovered as small spherical particles having an average particle diameter in the 10 to 30 micron range. A screen analysis shows that approximately 96% by weight of the product is less than 105 microns and approximately 85% is less than 44 microns.

EXAMPLE 2

Example 1 was substantially repeated except that the surface active agent solution, in addition to containing 12% Pluronic F-98, also contained 1.0% Unamide D-10 (a modified alkanolamide of Lonza, Inc.) as the particle size controlling surface active agent. In this case, 91% of the particles (by weight) were greater than 44 microns with the balance of the screen analysis being set forth in the table following the examples.

EXAMPLE 3

Example 1 was repeated except that Ninol 1285 (a coconut alkanolamide of Stepan Chemical Company) is used as a particle size-controlling surface active agent at a concentration of 0.25%. The same amount of particles as in Example 2 were larger than 44 microns but in a different distribution pattern.

EXAMPLES 4 through 9

These examples substantially repeated the process of Example 1 the differences being as noted.

| | |
|---|---|
| Example 4: | NA-202 Resin, a low density polyethylene resin (d = 0.915) with a melt index of 22 was dispersed without an alkanolamide surface active agent. |
| Examples 5 and 6: | NA-202 Resin was dispersed with Unamide D-10. |
| Example 7: | NA-211 Resin a low density polyethylene resin (d = 0.924) with a melt index of 5 was dispersed without an alkanolamide surface active agent. |
| Examples 8 and 9: | NA-211 Resin was dispersed with Unamide D-10. |

EXAMPLE 10

EY-901 Resin, an ethylene-vinyl acetate copolymer resin containing 40% vinyl acetate, was dispersed using Pluronic F-98 surface active agent alone. A very fine spherical particle dispersion with 98% or more of the particles less than 105 microns was produced. When it was attempted to filter the dispersion, the particles flowed together into a continuous mass.

EXAMPLE 11

Example 10 was substantially repeated, but using 2.5% ninol 1285. The resulting dispersion contained particles which were 94% greater in size than 44 microns. Because the average surface area of the particulate resin was very much less than with the finer particle dispersion, the tendency to agglomerate was considerably reduced. The dispersion of this example could be readily filtered and washed. Before drying, calcium stearate was added to the particulate resin at a rate of 5 to 10 parts per 100 parts of polymer as an anti-blocking agent. The powdered product was ideally suited for use as an impact modifier in rigid PVC formulations.

In the following table, the process conditions for each of Examples 1 to 11 are set forth together with the sieve analyses of the recovered resins. The sieve analyses for Examples 12 and 13, illustrative of a prior art process and carried out on a pilot-plant basis, are reported separately therein.

TABLE

| Example No. | 1 | 2 | 3 | 4 | 5 | 6 |
|---|---|---|---|---|---|---|
| Resin | LS-618 | LS-618 | LS-618 | NA-202 | NA-202 | NA-202 |
| Resin Type | HDPE | HDPE | HDPE | LDPE | LDPE | LDPE |
| Resin MI, gms/10 min | 17 | 17 | 17 | 22 | 22 | 22 |
| Resin Density, gms/cc | 0.962 | 0.962 | 0.962 | 0.915 | 0.915 | 0.915 |

TABLE-continued

| | | | | | | |
|---|---|---|---|---|---|---|
| Resin Feed Rate, lbs/hr | 20 | 20 | 20 | 20 | 20 | 20 |
| Surfactant No. 1 Type | F-98 | F-98 | F-98 | F-98 | F-98 | F-98 |
| Surfactant No. 1 Conc., % | 12.0 | 12.0 | 9.0 | 8.0 | 9.0 | 6.0 |
| Surfactant No. 2 Type | None | UN-D10 | N-1285 | None | UN-D10 | UN-D10 |
| Surfactant No. 2 Conc., % | 0 | 1.0 | 0.25 | 0 | 1.0 | 0.75 |
| Surfactant Solution Feed Rate, lbs/hr | 50 | 50 | 49 | 49 | 50 | 50 |
| Resin Concentration, % | 28.6 | 28.6 | 28.9 | 28.6 | 29.0 | 28.6 |
| Retention Time, min. | 16 | 16 | 16 | 16 | 16 | 16 |
| Agitator Tip Speed, ft/min | 1300 | 1300 | 1300 | 1050 | 1050 | 1050 |
| Reactor Temperature, °C. | 220 | 220 | 220 | 204 | 210 | 210 |

SIEVE ANALYSIS
CUMULATIVE % BY WEIGHT GREATER THAN

| Microns | | | | | | |
|---|---|---|---|---|---|---|
| 44 | 15.0 | 91.0 | 89.7 | 1.8 | 90.2 | 80.4 |
| 74 | 5.5 | 83.8 | 43.8 | 0.6 | 78.9 | 75.1 |
| 105 | 4.0 | 80.3 | 37.1 | 0.4 | 73.7 | 68.9 |
| 149 | — | 69.9 | 11.4 | 0.2 | 68.3 | 60.7 |
| 297 | — | 43.3 | 1.6 | 0.1 | 55.2 | 42.1 |

| Example No. | 7 | 8 | 9 | 10 | 11 |
|---|---|---|---|---|---|
| Resin | NA-211 | NA-211 | NA-211 | EY-901 | EY-901 |
| Resin Type | LDPE | LDPE | LDPE | EVA | EVA |
| Resin MI, gms/10 min | 5 | 5 | 5 | 1.4 | 1.4 |
| Resin Density, gms/cc | 0.924 | 0.924 | 0.924 | 0.975 | 0.975 |
| Resin Feed Rate, lbs/hr | 20 | 20 | 20 | 15 | 14.3 |
| Surfactant No. 1 Type | F-98 | F-98 | F-98 | F-98 | F-98 |
| Surfactant No. 1 Conc., % | 8.2 | 8.0 | 8.0 | 12.0 | 12.0 |
| Surfactant No. 2 Type | None | UN-D10 | UN-D10 | None | N-1285 |
| Surfactant No. 2 Conc., % | 0 | 0.25 | 0.50 | 0 | 2.5 |
| Surfactant Solution, Feed Rate, lbs/hr | 40 | 42 | 35 | 49 | 42 |
| Resin Concentration, % | 33.3 | 32.2 | 36.4 | 23.4 | 25.2 |
| Retention Time, min. | 15 | 17 | 20 | 19 | 20 |
| Agitator Tip Speed, ft/min | 1050 | 850 | 1250 | 1250 | 1250 |
| Reactor Temperature, °C. | 210 | 205 | 210 | 144 | 165 |

SIEVE ANALYSIS
CUMULATIVE % BY WEIGHT GREATER THAN

| Microns | | | | | |
|---|---|---|---|---|---|
| 44 | 5.6 | 68.8 | 94.5 | Flowed | 94 |
| 74 | 4.5 | 45.6 | 78.7 | together, | 89 |
| 105 | 4.4 | 32.1 | 64.2 | could | 83 |
| 149 | — | 19.1 | 47.0 | not | 73 |
| 297 | — | 2.9 | 2.8 | process. | 37 |

UN-D10 = Unamide D-10 of Lonza, Inc.
N-1285 = Ninol 1285 of Stepan Chemical Co.

EXAMPLE 12

LS-618 Resin was fed as a melt via an extruder into the reactor at a rate of about 250 pounds per hour. Actual feed rate for the continuous operating period ranged from 235 to 250 pounds per hour and averaged 246 pound per hour. A watersurface active agent solution containing 12% by weight Pluronic F-98 was heated to about 220° C. and fed to the reactor at a rate of about 650 pounds per hour. Actual feed rate during the period of this example ranged from 640 to 650 pounds per hour. An agitation system designed to provide vigorous agitation within the reactor was operated at a tip speed of 1050 fpm. Retention time in the reactor was approximately 14 minutes. The slurry flowed from the reactor through a cooling exchanger to a pressure letdown valve and was discharged to a holding, or surge, tank. The slurry was filtered, repulped with water, and passed over a vibrating screen fitted with a 112 micron opening, monofilament nylon screen cloth. The oversize, or plus 112 micron fraction, was centrifuged and the cake was retained for reprocessing; the undersize, or minus 112 micron fraction, was filtered, dried and packaged. The minus 112 micron fraction was recovered as small spherical particles having an average particle diameter in the 3 to 30 micron range. The plus 112 micron fraction was recovered as a mixture of spherical particles, larger non-spherical particles and fibers and strings. In this production period, 18,900 pounds of minus 112 micron specification product and 1280 pounds of plus 112 micron oversize were recovered, thus 93.7% of the throughput was less than 112 microns and 6.3% was greater than 112 microns. A screen analysis of the undersize, or minus 112 micron fraction showed a cumulative total of 0.10% greater than 105 microns, 0.43% greater than 74 microns, and 5.59% greater than 44 microns. Thus 93.6% of the total throughput was less than 105 microns and 88.1% was less than 44 microns. A Coulter Counter particle size analysis of the minus 112 micron fraction showed that the geometric average particle size by volume was about 11 microns.

EXAMPLE 13

The reactor was operated some 650 hours over a five week period processing the LS-618 linear polyethylene resin. Resin feed rate to the reactor ranged from 228 to 267 pounds per hour and averaged 250 pounds per hour. Concentration of Pluronic F-98 in the water-surface active agent solution ranged from 11.1% to 12%, but was generally maintained at 12%. Feed rate of this solution ranged from 640 to 650 pounds per hour. Temperature in the reactor ranged from 209° to 221° C. Agitator speed was held constant at a tip speed of 1050 fpm. Processing of the product from the reactor was carried out as in the previous example. In this period, a total of 84,045 pounds of resin were fed to the reactor and 80,585 pounds of product were recovered, the losses incurred being normal in the operation of a pilot plant. Of the 80,585 pounds of material recovered in this period, 76,275 pounds or 94.7% was less than 112 microns and 4310 pounds or 5.3% was greater than 112 microns. Coulter Counter particle size analysis of the minus 112 micron fraction showed the geometric mean average particle diameter by volume to be about 13 microns.

What is claimed is:

1. A process for preparing solid organic polymeric thermoplastic resin particles of controlled particle size which comprises:
   (a) agitating a mixture of the resin while in the molten state, a dispersion-forming agent amount of water, a dispersion-forming amount of a polyalkyleneoxide surface active agent, and a particle size-controlling amount of an alkanolamide surface active agent to provide a dispersion; and,
   (b) cooling the dispersion to below the melting point of the resin to provide solid particles of resin having a broader average size range than that obtainable using polyalkyleneoxide surface active agent alone.

2. The process of claim 1 in which the resin is a polyolefin homopolymer or copolymer.

3. The process of claim 2 in which the resin is polyethylene.

4. The process of claim 2 in which the resin is ethylene-vinyl acetate copolymer.

5. The process of claim 1 in which the polyalkyleneoxide surface active agent is an ethylene oxide-propylene oxide block copolymer surface active agent.

6. The process of claim 1 in which the alkanolamide surface active agent is the reaction product of an alkanolamine and a saturated or unsaturated higher fatty acid.

7. The process of claim 6 in which the alkanolamine is ethanolamine, diethanolamine or isopropanolamine and the higher fatty acid is lauric, myristic, palmitic, stearic, arachidic or lignoceric acid.

8. The process of claim 6 in which the alkanolamine is ethanolamine, diethanolamine or isopropanolamine and the higher fatty acid is oleic, linoleic, linolenic, rincinoleic or arachidonic acid.

9. The process of claim 8 in which the higher fatty acid is partially or fully hydrogenated.

10. The process of claim 1 in which the amount of water used in relation to the polymer dispersed ranges from 0.7 to about 10 parts by weight per part of polymer.

11. The process of claim 1 in which the amount of polyalkyleneoxide surface active agent used in relation to the polymer ranges from about 6 to about 100 weight parts by weight per 100 weight parts of polymer.

12. The process of claim 1 in which the weight ratio of polymer to the alkanolamide surface active agent ranges from about 200:1 to about 10:1.

* * * * *